US012118235B2

(12) United States Patent
Hanham et al.

(10) Patent No.: US 12,118,235 B2
(45) Date of Patent: Oct. 15, 2024

(54) METHOD AND SYSTEM FOR BUFFER ALLOCATION MANAGEMENT FOR A MEMORY DEVICE

(71) Applicant: Kioxia Corporation, Tokyo (JP)

(72) Inventors: Paul Hanham, Milton (GB); Julien Margetts, Milton (GB); Matthew Stephens, Milton (GB)

(73) Assignee: KIOXIA CORPORATION, Tokyo (JP)

( * ) Notice: Subject to any disclaimer, the term of this patent is extended or adjusted under 35 U.S.C. 154(b) by 326 days.

(21) Appl. No.: 17/402,192

(22) Filed: Aug. 13, 2021

(65) Prior Publication Data

US 2023/0047029 A1    Feb. 16, 2023

(51) Int. Cl.
*G06F 3/06* (2006.01)

(52) U.S. Cl.
CPC .......... *G06F 3/0656* (2013.01); *G06F 3/0604* (2013.01); *G06F 3/0631* (2013.01); *G06F 3/0659* (2013.01); *G06F 3/0679* (2013.01)

(58) Field of Classification Search
CPC ...... G06F 3/0604; G06F 3/061; G06F 3/0631; G06F 3/0656; G06F 3/0659; G06F 3/0679
See application file for complete search history.

(56) References Cited

U.S. PATENT DOCUMENTS

| 9,158,705 | B2 | 10/2015 | Topp et al. | |
| 2018/0349280 | A1* | 12/2018 | Prasad | G06F 12/128 |
| 2019/0026191 | A1* | 1/2019 | Battaje | G06F 3/0641 |

FOREIGN PATENT DOCUMENTS

| CN | 104981872 A | 10/2015 |
| CN | 110321305 A | 10/2019 |
| CN | 112445720 A | 3/2021 |
| TW | I506431 B | 11/2015 |

OTHER PUBLICATIONS

Office Action with Search Report issued in Taiwanese application No. 111130048 dated May 23, 2023.

* cited by examiner

*Primary Examiner* — Larry T Mackall
(74) *Attorney, Agent, or Firm* — Foley & Lardner LLP

(57) ABSTRACT

Example implementations include a non-transitory processor-readable media comprising processor-readable instructions that when executed by at least one processor of a controller, causes the processor to generate at least one memory address corresponding respectively to at least one command block, the command block being associated with a command to a memory device, allocate the memory address to a buffer addressing unit associated with a host interface, the memory address including a buffer memory identifier associated with a buffer memory block and a buffer memory address associated with the buffer memory block, and update a request count associated with the buffer memory block by incrementing a reference counter associated with the buffer memory block.

20 Claims, 12 Drawing Sheets

METHOD AND SYSTEM FOR BUFFER ALLOCATION MANAGEMENT FOR A MEMORY DEVICE

TECHNICAL FIELD

The present implementations relate generally to electronic memory devices, and more particularly to buffer allocation management for a memory device.

BACKGROUND

Electronics devices are increasingly expected to perform in wider application areas and under increasingly smaller form factors. Accordingly, electronic memory devices are expected to increasingly operate at faster speeds and under small footprints to support a broader range of electronic devices associated with a broader range of application areas. However, conventional systems can require buffering systems that increase size and reduce speed of operation of electronic memory devices.

SUMMARY

It is advantageous to provide buffer allocation for a memory device that reduces size of the memory device and maintains or increases speed of the memory device. Thus, it is advantageous to provide a memory device with buffer allocation management that reduces the number of buffer memory devices and maintains or increases address ranges for management of buffer allocation. During memory write operations, an external command may be received at a memory device before data buffered at the memory device is written to nonvolatile, permanent, or like storage. Reference counters associated with buffer memory blocks of the memory device can track the number of requests for the buffer memory block. The buffer memory block can be deallocated and the memory space erased, overwritten, or the like, when the number of requests for the buffer memory block reaches zero. Buffer memory devices with a significant number of transactions requested at any given time can require a corresponding increase in the size and number of reference counters associated with each memory device. Present implementations include a flexible buffer allocation management system that can be tailored advantageously to match particular configurations of a memory device, applications with which the memory device can be associated, or the like. Specifically, present implementations can include one of more overflow counters with large count capacities to accommodate reference counter overflows that may occur based on a large number of requests for a particular block of information before that information is transferred to nonvolatile memory. The number and size of overflow counters can be varied based on the relative likelihood that a reference counter overflow can occur, and can also be varied based on the amount of expected or predicted overflow that can occur with respect to a reference counter. Thus, a technological solution for buffer allocation management for a memory device is provided.

Example implementations include a non-transitory processor-readable media comprising processor-readable instructions that when executed by at least one processor, causes the processor to determine whether a request count associated with a buffer memory block satisfies a reference threshold associated with the reference counter, update, in accordance with a determination that the request count does not satisfy the reference threshold, the request count by incrementing a request count at a reference counter associated with the buffer memory block, allocate an overflow counter to the reference counter, in response to a determination that the request count satisfies the reference threshold, increment, in response to a determination that the overflow counter is allocated to the reference counter, an overflow count associated with the overflow counter.

Example implementations also include a non-transitory processor-readable media including processor-readable instructions that when executed by at least one processor of a controller, causes the processor to send a completion notification to a buffer manager accelerator, the completion notification indicating at least one command block address corresponding to at least one command block at a buffer memory block, decrement, in response to a determination that an overflow counter is allocated to the reference counter, an overflow count associated with the overflow counter, determine whether the request count satisfies a reference threshold associated with the reference counter, and deallocate the overflow counter from the reference counter, in response to a determination that the request count satisfies the reference threshold.

Example implementations also include a storage device with a non-volatile memory, a host interface to generate at least one memory address corresponding respectively to at least one command block, the command block being associated with a command to a memory device, determine whether the request count associated with a buffer memory block satisfies a reference threshold associated with the reference counter, update, in accordance with a determination that the request count does not satisfy the reference threshold, a request count by incrementing a reference counter associated with the buffer memory block, allocate an overflow counter to the reference counter, in response to a determination that the request count satisfies the reference threshold, increment, in response to a determination that the overflow counter is allocated to the reference counter, an overflow count associated with the overflow counter, decrement, in response to a determination that an overflow counter is allocated to the reference counter, an overflow count associated with the overflow counter, determine whether the request count satisfies a reference threshold associated with the reference counter, and deallocate the overflow counter from the reference counter, in response to a determination that the request count satisfies the reference threshold, and a flash interface to reconstruct the command from the command block, and send the completion notification to the host interface, the completion notification indicating the command block address corresponding to the command block at the buffer memory block.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
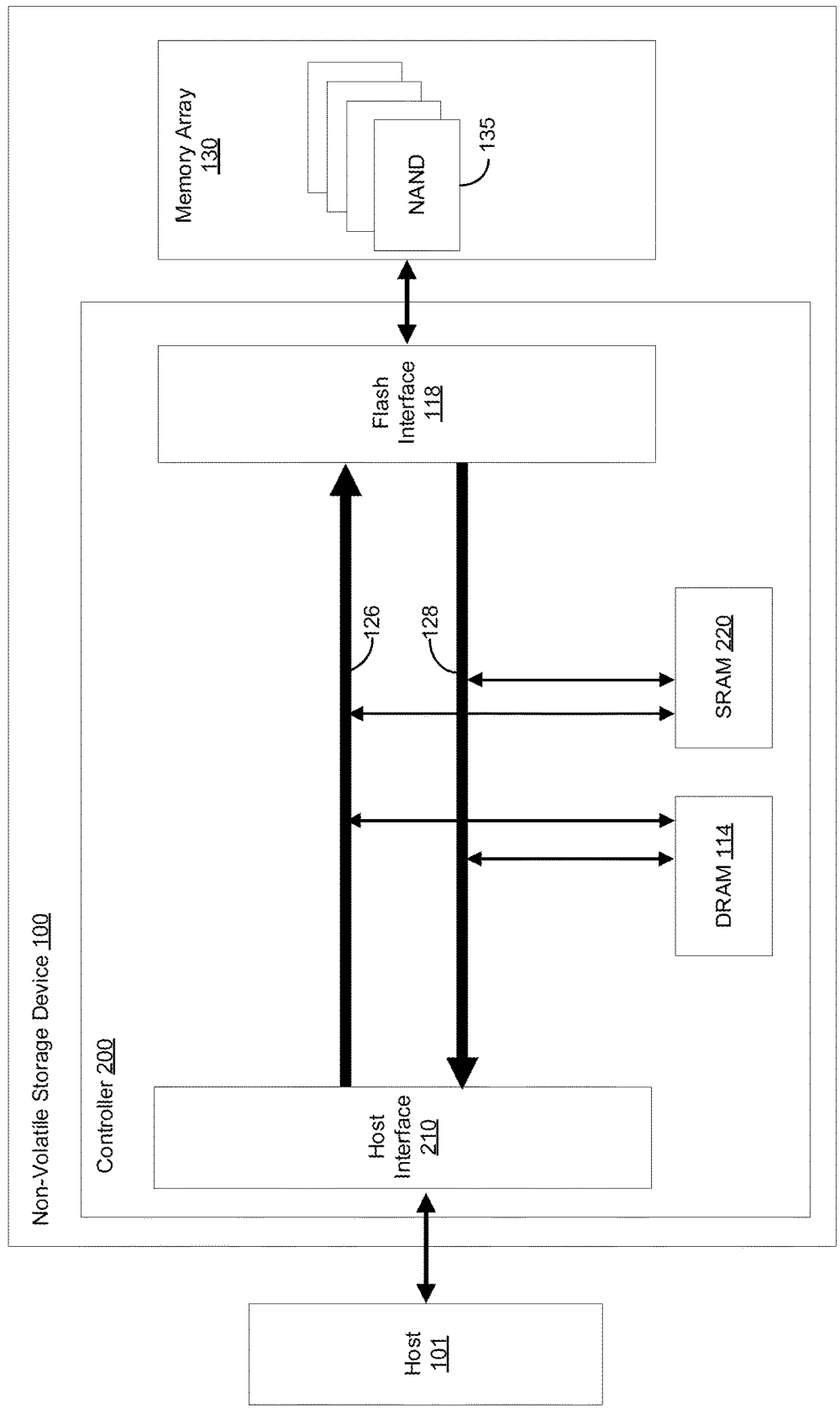
FIG. 1 illustrates an example system including a non-volatile storage device and a host, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Electronic memory device can receive, send, and store significant quantities of information physically and tangibly within the electronic bits therein. These memory devices can also perform read and write operations, among others, in significant volumes in short period of time. At a high volume of transactions that can number into the millions and billions, even delays in executing operations at the memory device by electronic components thereof can introduce significant human-perceptible delays measurable in seconds or minutes, for example.

In addition, electronic memory devices can include a significant number, volume, weight, or the like, of electronic devices for buffer allocation management. Reduction in any of these characteristics can result in an effect on speed of a memory device. Thus, it is advantageous to maintain or increase speed of operation of an electronic memory device by reducing electronic component characteristics as discussed above associated with buffer allocation management, while maintaining buffer addressability for a significant fraction of addressing conditions for the memory device. As one example, a significant fraction of addressing condition can be a condition in which 80% or more addressing operations for buffer allocation management can be executed when ready to an available address at a buffer memory of a memory device. As another example, a significant fraction of addressing condition can be a condition in which 98% or more addressing operations for buffer allocation management can be executed when ready to an available address at a buffer memory of a memory device. It is to be understood that speed of a memory device can be reduced in response to an addressing operation that cannot be executed when ready to a buffer memory. Thus, it is advantageous to balance reduction in component usage in a memory device with availability and accessibility of buffer address ranges. It is to be understood that buffer address ranges can be represented by request counts, where the request counts can span multiple addresses.

In some implementations, a reference counter increments for write buffers due to read-hits-on-writes. This operation can be limited by the number of possible outstanding read commands. The number of possible outstanding read command can then be limited by the number of active commands and the number of buffer-linked list nodes. As one example, each command that is associated with more than one buffer is associated with a linked list of buffers. With 8192 linked list nodes, 32 buffers would each accommodate 255 identical read commands. As one example, all of these could receive access requests for, or "hit" on a write buffer, resulting in maximizing the capacity of, or "saturating," 32 write buffers. As another example, the buffers can retain 1024−256=768 available single-buffer commands after saturation of the linked-list command. As one example, the single-buffer commands can saturate 3 write buffers.

In some implementations, an overflow counter is of 32 bit capacity. In some implementations, the overflow counter is assigned to a buffer-id when a normal ref-count saturates. In some implementations, the overflow counter is searched upon a memory device or external device request to access the ref-count. In some implementations, the overflow counter has at least one of a higher capacity and a slower response time than a reference counter. In some implementations, the overflow counter is accessed less frequently, minimizing its impact on speed of operation of the memory device. As one example, implementation of a overflow counter can reduce an SRAM physical memory array from 512 KB to at or approximately 256 KB, resulting in an advantageous reduction of an SRAM physical memory array footprint by 50% while substantially maintaining speed of buffering operation of the SRAM physical memory array.

It is to be understood that the number and size of overflow counters with respect to reference counters can vary to minimize or eliminate reference counter overflows, while minimizing increases in device complexity and cost due to increased counter device circuits, electronics, logic, and the like. As one example, the number of overflow counters can depend on at least one of a frequency of overflow and a magnitude of overflow. A memory device associated with a high-magnitude application, may have a high potential magnitude of overflow. A memory device associated with a high-magnitude application with large bandwidth, throughput, or the like, may also have a high potential magnitude of overflow. To accommodate frequency overflow cases, present implementations can include a particular number of overflow counters high enough to accommodate a maximum predicted number of requests over a maximum reference counter bit length, to mitigate the frequency of overflow. The bit length of the reference counters can also be modified to reduce the frequency of overflow. To accommodate magnitude overflow cases, present implementations can include overflow counters having a particular bit length long enough to accommodate a maximum predicted number of requests for a buffer memory, to mitigate the frequency of overflow.

FIG. 1 illustrates an example system including a non-volatile storage device and a host, in accordance with present implementations. As illustrated by way of example in FIG. 1, an example non-volatile storage device 100 includes a controller 110 operatively coupled to a host 101, and a memory array 130.

To assist in illustrating the present implementations, FIG. 1 shows a block diagram of a system including a non-volatile storage device 100 coupled to a host 101 according to some implementations. In some examples, the host 101 can be a user device operated by a user. The host 101 can include an Operating System (OS), which is configured to provision a filesystem and applications which use the filesystem. The filesystem communicates with the non-volatile storage device 100 (e.g., a controller 110 of the non-volatile storage device 100) over a suitable wired or wireless communication link, bus, or network to manage storage of data in the non-volatile storage device 100. In that regard, the filesystem of the host 101 sends data to and receives data from the non-volatile storage device 100 using a suitable interface to the communication link or network.

In some examples, the non-volatile storage device 100 is located in a datacenter (not shown for brevity). The datacenter may include one or more platforms or rack units, each of which supports one or more storage devices (such as but not limited to, the non-volatile storage device 100). In some implementations, the host 101 and non-volatile storage device 100 together form a storage node, with the host 101 acting as a node controller. An example of a storage node is a Kioxia Kumoscale storage node. One or more storage nodes within a platform are connected to a Top of Rack (TOR) switch, each storage node connected to the TOR via one or more network connections, such as Ethernet, Fiber Channel or InfiniBand, and can communicate with each other via the TOR switch or another suitable intra-platform communication mechanism. In some implementations, the non-volatile storage device 100 may be network attached storage devices (e.g. Ethernet SSDs) connected to the TOR switch, with host 101 also connected to the TOR switch and able to communicate with the storage devices 100 via the TOR switch. In some implementations, at least one router may facilitate communications among different non-volatile storage devices in storage nodes in different platforms, racks, or cabinets via a suitable networking fabric. Examples of the non-volatile storage device 100 include non-volatile devices such as but are not limited to, Solid State Drive (SSDs), Ethernet attached SSDs, a Non-Volatile Dual In-line Memory Modules (NVDIMMs), a Universal Flash Storage (UFS), a Secure Digital (SD) devices, and so on.

The non-volatile storage device 100 includes at least a controller 110 and a memory array 130. Other components of the non-volatile storage device 100 are not shown for brevity. The memory array 130 includes NAND flash memory devices 135. Each of the NAND flash memory devices 135 includes one or more individual NAND flash dies, which are Non-Volatile Memory (NVM) capable of retaining data without power. Thus, the NAND flash memory devices 135 refer to multiple NAND flash memory devices or dies within the flash memory device 100. Each of the NAND flash memory devices 135 includes one or more dies, each of which has one or more planes. Each plane has multiple blocks, and each block has multiple pages.

While the NAND flash memory devices 135 are shown to be examples of the memory array 130, other examples of non-volatile memory technologies for implementing the memory array 130 include but are not limited to, battery-backed Dynamic Random Access Memory (DRAM), Magnetic Random Access Memory (MRAM), Phase Change Memory (PCM), Ferro-Electric RAM (FeRAM), and so on.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the plurality of NAND flash memory devices 135 such that those NAND flash memory devices 135 function as a single storage. The controller 110 can include microcontrollers, buffers, error correction systems, Flash Translation Layer (FTL), host interface, and flash interface modules. For example, as shown, the controller 110 includes a host interface 210, flash interface 118, DRAM 114, and SRAM 220. While shown as a part of the controller, in some implementations, one or more of the DRAM 114 or SRAM 220 can be in whole or in part external to the controller 110. Other components of the controller 110 are not shown. Such functions can be implemented in hardware, software, and firmware or any combination thereof. In some arrangements, the software/firmware of the controller 110 can be stored in the memory array 130 or in any other suitable computer readable storage medium.

The controller 110 includes suitable processing and memory capabilities (e.g., one or more Central Processing Units (CPUs)) for executing functions described herein, among other functions. As described, the controller 110 manages various features for the NAND flash memory devices 135 including, but not limited to, I/O handling, reading, writing/programming, erasing, monitoring, logging, error handling, garbage collection, wear leveling, logical to physical address mapping, data protection (encryption/decryption, Cyclic Redundancy Check (CRC)), ECC, data scrambling, and the like. Thus, the controller 110 provides visibility to the NAND flash memory devices 135.

The host 101 connects to the non-volatile storage device 100 (e.g., the controller 110) via the host interface 210, which conforms to a storage interface standard. Examples of the communication interface standard implemented for the host interface 210 include standards such as but not limited to, Serial Advanced Technology Attachment (SATA), Serial Attached SCSI (SAS), Peripheral Components Interconnect Express (PCIe), and so on. The host interface 210 (e.g., a command parser) can receive commands (e.g., write commands, read commands, trim/unmap/deallocate commands, and so on) from the host 101 and data associated thereof via the communication interface, and processes the commands with respect to the associated data.

For example, with respect to a write operation, the host interface 210 receives a write command and data to be written from the host 101. The host interface 210 parses the command and provides the data via a write data path 126 to the flash interface 118. With respect to a read operation, the flash interface 118 reads the data (corresponding to a logical address included in a read command from the host 101) from the memory array 130 and provides the data via a read data path 128 to the host interface 210. The host interface 210 provides the data to the host 101.

The write data path 126 and the read data path 128 can be individually or collectively a physical or virtual/software channel or bus implemented on or by the controller 110. The d write data path 126 and the read data path 128 can carry data between the host interface 210 and the flash interface 118. The write data path 126 and the read data path 128 can include one or more flip-flops and other components on a semiconductor device. While shown as continuous paths between the host interface 210 and the flash interface 118, a data path can be split in time by staging or buffering data temporarily in the DRAM 114 and/or the SRAM 220.

As shown, the data can be buffered temporarily in the buffer memory as part of its passage through one or more of the write data path 126 and the read data path 128. Such buffer memory includes, for example, the DRAM 114 and the SRAM 220, which are both volatile memory. For example, along the write data path 126, data to be encoded by the encoder 122 can be temporarily stored (buffered or cached) in one or more of the DRAM 114 or the SRAM 220 before being provided to the encoder 122. As such, the one or more of the DRAM 114 or the SRAM 220 correspond to write buffers. Along the read data path 128, data decoded at the decoder 124 can be stored (buffered or cached) in one or more of the DRAM 114 or the SRAM 220 before being provided to the host interface 210. As such, the one or more of the DRAM 114 or the SRAM 220 correspond to read buffers.

In some examples, the SRAM 220 is a memory device local to or operatively coupled to the controller 110. For instance, the SRAM 220 can be an on-chip SRAM memory located on the chip of the controller 110. In some examples, the DRAM 114 can be implemented using a memory device of the storage device 100 external to the controller 110. For instance, the DRAM 114 can be DRAM located on a chip other than the chip of the controller 110. In some implementations, the buffer memory can be implemented using memory devices that are both internal and external to the controller 110 (e.g., both on and off the chip of the controller 110). For example, the buffer memory can be implemented using both an internal SRAM 220 and an external DRAM 114. In this example, the controller 110 includes an internal processor that uses memory addresses within a single address space and the memory controller, which controls both the internal SRAM 220 and external DRAM 114, selects whether to place the data on the internal SRAM 220 or the external DRAM 114 based on efficiency. In other words, the internal SRAM 220 and external DRAM 114 are addressed like a single memory. In other implementations, one of the internal SRAM 220 or the external DRAM 114 is used to buffer data. The DRAM 114 and the SRAM 220 are used to illustrate external and internal buffer memory of or coupled to the controller 110. Other types of buffer memories, volatile or non-volatile, can be used.

The flash interface 118 can include or operatively coupled to one or more non-volatile memory channel controllers (not shown), which are also referred to as flash controllers. The memory array 130 includes one or more non-volatile (non-transitory) NAND flash memory devices 135, each of which can include multiple banks of die coupled to the non-volatile memory channel controllers by flash memory buses such as memory channels. The channel controllers includes scheduler logic (e.g., a scheduler) that controls scheduling of memory commands/operations (e.g., write commands, read commands, garbage collection, trim/unmap/deallocate commands, and so on) with respect to the memory array 130. For example, the channel controllers take the memory commands from a flash interface layer of the flash interface 118 and schedule the commands on the individual memory channels, performing the memory bus control signaling and data transfers to the memory dies and checking the memory die status for the success or failure of the commands.

While non-volatile memory devices (e.g., the NAND flash memory devices 135) are presented as examples herein, the disclosed schemes can be implemented on any storage system or device that is connected to the host 101 over an interface, where such system temporarily or permanently stores data for the host 101 for later retrieval.

Figure 2:
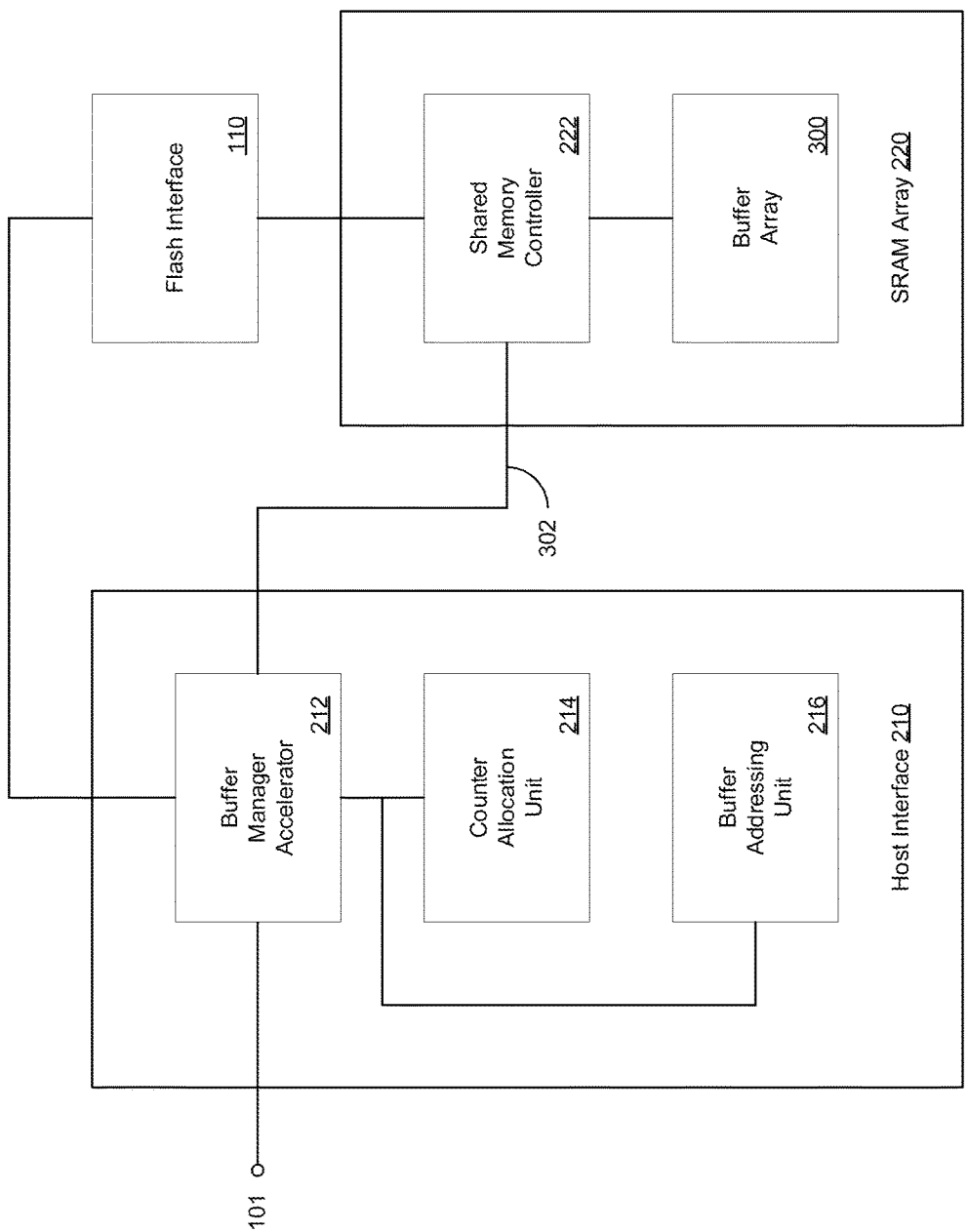
FIG. 2 illustrates an example system including an example host interface, an example flash interface, and an example SRAM buffer array, in accordance with present implementations.

FIG. 2 illustrates an example system including an example host interface, an example flash interface, and an example SRAM buffer array, in accordance with present implementations. As illustrated by way of example in FIG. 1, an example system 200 includes the flash interface 110, the host interface 210 and the SRAM array 220. The host interface 210 includes a buffer manager accelerator 212, a counter allocation unit 214, and a buffer addressing unit 216. The SRAM array includes a shared memory controller 222, a buffer array 300, and a buffer communication channel 302.

The buffer manager accelerator 212 is operable to receive and transmit instructions or the like with the host 101, the shared memory controller 222, the counter allocation unit 214, and the buffer addressing unit 216. In some implementations, the buffer manager accelerator 212 includes a hardware interface to control one or more of the counter allocation unit 214 and the buffer addressing unit 216. The buffer manager accelerator 212 can manage addressing and counting of allocation of buffer memory blocks of the buffer array 300. In some implementations, the buffer manager accelerator 212 advantageously supports direct addressing of one or more command blocks stored at corresponding buffer memory blocks of the buffer array 300. It is to be understood that direct addressing of command blocks at their corresponding buffer memory blocks can significantly reduce physical read and write times for the controller 110 and the memory device 100, by increasing the speed of allocation and deallocation of physical buffer memory blocks of the buffer array. It is to be understood that that physical addresses and physical blocks can include physical addresses and logical addresses corresponding to physical addresses. In some implementations, the buffer manager accelerator 212 is operable to provide one or more instructions to the counter allocation unit 214 and the buffer addressing unit 216 to update requests counts associated with various buffer memory blocks of the buffer array 300, to maintain a record of allocated buffer memory blocks, and to allocate and deallocate buffer memory blocks based on the record of allocated buffer memory blocks. In some implementations, the buffer manager accelerator 212 instructs the shared memory controller 222 to allocate and deallocate buffer memory blocks of the buffer array 300.

It is advantageous to control allocation and deallocation at the buffer manage accelerator 212 to provide an integrated interface for allocation and deallocation of the buffer array of the SRAM array 220 that both can reduce cost and complexity of implementation. As one example, allocation and deallocation operations contained in the buffer manager accelerator 212 can eliminate the need to integrate separate corresponding components into an SRAM array that may increase cost and complexity of the SRAM array, and reduce flexibility and interoperability of the SRAM array. In some implementations, the buffer manager accelerator 212 includes one or more logical or electronic devices including but not limited to integrated circuits, logic gates, flip flops, gate arrays, programmable gate arrays, and the like. It is to be understood that any electrical, electronic, or like devices, or components associated with the buffer manager accelerator 212 can also be associated with, integrated with, integrable with, replaced by, supplemented by, complemented by, or the like, a system processor or any component thereof.

The counter allocation unit 214 is operable to allocate and deallocate one or more buffer memory blocks of the buffer array 300. In some implementations, the counter allocation unit 214 is operable to generate one or more instructions to increment or decrement a request count associated with one or more buffer memory blocks of the buffer array 300. The counter allocation unit 214 can also generate one or more instructions to allocate or deallocate one or more buffer memory blocks of the buffer array 300. In some implementations, the counter allocation unit 214 is operable to allocate or deallocate one or more buffer memory blocks of the buffer array 300 by instructing the shared memory controller to allocate or deallocate one or more buffer memory blocks of the buffer array 300. Thus, in some implementations, the counter allocation unit 214 can both control requests counts indicating a number of requests for access to a buffer memory block, and can free a buffer memory block when no request remain associated with the buffer memory block. In some implementations, the counter allocation unit 214 includes one or more logical or electronic devices including but not limited to integrated circuits, logic gates, flip flops, gate arrays, programmable gate arrays, and the like. It is to be understood that any electrical, electronic, or like devices, or components associated with the counter allocation unit 214 can also be associated with, integrated with, integrable with, replaced by, supplemented by, complemented by, or the like, the buffer manager accelerator 212 or any component thereof.

In some implementations, the counter allocation unit 214 is operable to allocate at least one overflow counter of the buffer array 300 to a corresponding reference counter of the buffer array 300. As one example, the counter allocation unit 214 can include, control, or the like, at least one physical, logical, or the like counter identification array. The counter identification array can be include one or more keys, primary indices, or the like, each associated with a particular overflow counter. As one example, the keys, primary indices, or the like can include indices of the counter identification array corresponding to an identification key, primary index, or the like, associated with a corresponding overflow counter. The counter identification array can store a value corresponding to a physical address, logical address, or the like, associated with a reference counter of the buffer array 300. Thus, in some implementations, a cell of the counter identification array that includes an address for a reference counter can indicate that the corresponding buffer memory block is in an overflow state, and that the corresponding overflow counter maintains an overflow count for the buffer memory block. As one example, the cells of the counter identification array can have an 18-bit length, to correspond to an 18-bit address length for each reference counter of the buffer array 300. It is to be understood that the cells of the counter identification array are not limited to an 18-bit length, and can have a larger or smaller bit length depending on memory configuration, use case, application, or the like.

The buffer addressing unit 216 is operable to store one or more addresses associated with one or more command blocks located at one or more corresponding buffer memory blocks of the buffer array 300. In some implementations, the buffer addressing unit 216 is operable to store addresses for one or more linked lists including one or more command blocks. In some implementations, the buffer addressing unit 216 is operable to store one or more addresses for each command block in a linked list of command blocks, and is thus operable to directly retrieve a linked list node address by directly addressing a command block of the linked list of commands blocks.

It is to be understood that direct addressing of a linked list of command blocks can advantageously reduce time required to execute a memory device operation with respect to the buffer addressing unit and the buffer array. It is to be further understood that direct addressing reduces addressing time from a linear time delay dependent on the time to access all command blocks of the length of the linked list, or an order of O(N), to a constant time delay dependent on the time to access a single command blocks in the linked list, or an order of O(1). In some implementations, the buffer addressing unit 216 is operable to transmit buffer memory block address corresponding to all command blocks for a linked list in O(1) time, thus significantly maintaining or increasing speed of allocation and deallocation of memory blocks in the physical SRAM array 220. In some implementations, the buffer addressing unit 216 includes one or more logical or electronic devices including but not limited to integrated circuits, logic gates, flip flops, gate arrays, programmable gate arrays, and the like. It is to be understood that any electrical, electronic, or like devices, or components associated with the buffer addressing unit 216 can also be associated with, integrated with, integrable with, replaced by, supplemented by, complemented by, or the like, the buffer manager accelerator 212 or any component thereof.

The shared memory controller 222 is operable to execute one or more instructions to modify allocation of the buffer array 300. In some implementations, the shared memory controller 222 is operable to execute one or more instructions to increment and decrement reference counters of the buffer array in response to instructions therefor received by the buffer manager accelerator 212. In some implementations, the shared memory controller 222 includes one or more memory addressing components operatively coupled to one or more buffer memory blocks and reference counters of the buffer array. Thus, in some implementations, the shared memory controller 222 is operable to execute incrementing and decrementing operations and read and write commands to buffer memory blocks of the buffer array 300 by a single type of integrating array addressing component. It is to be understood that execution of these multiple classes of operations advantageously reduces the physical footprint of the shared memory controller 222, and thus the SRAM array 220, and also maintains and increases speed of memory operations of the SRAM array 220 and the flash interface 110. In some implementations, the shared memory controller 222 includes one or more logical or electronic devices including but not limited to integrated circuits, logic gates, flip flops, gate arrays, programmable gate arrays, and the like.

The buffer array 300 is operable to store one or more command blocks associated with commands received from the host 101 by buffer manager accelerator 212 of the host interface 210. In some implementations, the buffer array 300 is operable to receive one or more instructions from the shared memory controller 222, and to transmit one or more command blocks to the shared memory controller. In some implementations, the buffer array 300 includes one or more logical or electronic devices including but not limited to integrated circuits, logic gates, flip flops, gate arrays, programmable gate arrays, and the like.

The buffer communication channel 302 is operable to transmit one or more instructions between the buffer manager accelerator 212 and the shared memory controller 222. In some implementations, the buffer communication channel 302 includes one or more digital, analog, or like communication channels, lines, traces, or the like. As one example, the buffer communication channel 302 is or includes at least one serial or parallel communication line among multiple communication lines of a communication interface. In some implementations, the buffer communication channel 302 is or includes one or more wireless communication devices, systems, protocols, interfaces, or the like. In some implementations, the buffer communication channel 302 includes one or more logical or electronic devices including but not limited to integrated circuits, logic gates, flip flops, gate arrays, programmable gate arrays, and the like. In some implementations, the buffer communication channel 302 includes ones or more telecommunication devices including but not limited to antennas, transceivers, packetizers, wired interface ports, and the like. It is to be understood that any electrical, electronic, or like devices, or components associated with the buffer communication channel 302 can also be associated with, integrated with, integrable with, replaced by, supplemented by, complemented by, or the like, the write data path 126, the read data path 128, the controller 200, or any component thereof.

Figure 3:
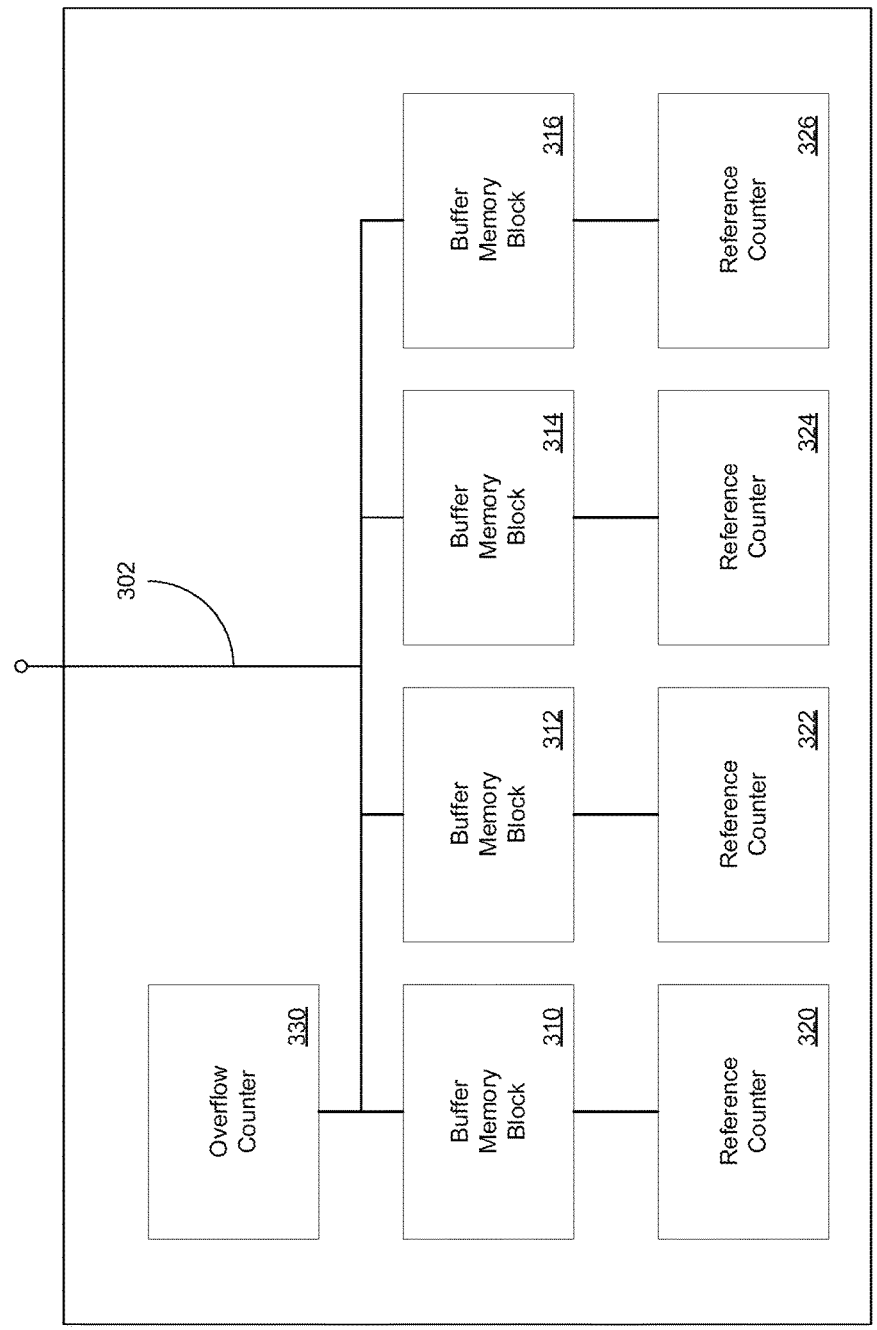
FIG. 3 illustrates an example buffer array of an example SRAM buffer array, in accordance with present implementations.

FIG. 3 illustrates an example buffer array of an example SRAM array, in accordance with present implementations. As illustrated by way of example in FIG. 3, an example SRAM array 300 includes buffer memory blocks 310, 312, 314 and 316, reference counters 320, 322, 324 and 326, and overflow counter 330.

The buffer memory blocks 310, 312, 314 and 316 are individually and collectively operable to store at least one command block associated with a command received from the host 101. In some implementations, the command block is associated with a command satisfying a reference threshold associated with each of the buffer memory blocks 310, 312, 314 and 316. As one example, the reference threshold can be a maximum size associated with each of the buffer memory blocks 310, 312, 314 and 316. As another example, the reference threshold can be a maximum number of addresses or instructions associated with each of the buffer memory blocks 310, 312, 314 and 316. In some implementations, a command block is or includes a plurality of instructions or addresses, and is storable in a single one of the buffer memory blocks 310, 312, 314 and 316. In some implementations, the command block is smaller than the reference threshold, and more than one command block can be stored in a single one of the buffer memory blocks 310, 312, 314 and 316. In some implementations, one command does not satisfy the reference threshold, and is separated into a plurality of command blocks. In some implementations, a linked list of these command blocks of the command is stored in a plurality of the buffer memory blocks 310, 312, 314 and 316. In some implementations, the buffer memory blocks 310, 312, 314 and 316 includes one or more logical or electronic devices including but not limited to integrated circuits, logic gates, flip flops, gate arrays, programmable gate arrays, and the like. It is to be understood that the number of buffer memory blocks is not limited to the number illustrated by way of example in FIG. 3, and can be of a greater or lesser number.

The reference counters 320, 322, 324 and 326 are individually and collectively operable to store an indication of the allocation of respective ones of the buffer memory blocks 310, 312, 314 and 316. In some implementations, the reference counters 320, 322, 324 and 326 includes respective counter circuits having a size of a predetermined number of bits. As one example, each respective one of the reference counters 320, 322, 324 and 326 can have a size in bit length of 1, 2, 4, 8 or 16 bits. It is to be understood that the reference counters 320, 322, 324 and 326 are not limited in size to the example bit lengths discussed above. In some implementations, the reference counters 320, 322, 324 and 326 are operable to store an indication of a number of requests for access to the respective buffer memory blocks 310, 312, 314 and 316. In some implementations, each of the reference counters 320, 322, 324 and 326 are operatively coupled to a corresponding one of the buffer memory blocks 310, 312, 314 and 316. In some implementations, requests include request for access from the host 101 or the host interface 210. In some implementations, the reference counters 320, 322, 324 and 326 include one or more logical or electronic devices including but not limited to integrated circuits, logic gates, flip flops, gate arrays, programmable gate arrays, and the like. It is to be understood that the number of reference counters is not limited to the number illustrated by way of example in FIG. 3, and can be of a greater or lesser number corresponding to the number of buffer memory blocks.

The overflow counter 330 is operable to store an indication of a number of requests for access to at least one of the respective buffer memory blocks 310, 312, 314 and 316, further to the an indication of a number of requests for access to the respective buffer memory blocks 310, 312, 314 and 316 stored by the reference counters 320, 322, 324 and 326. In some implementations, the overflow counter 330 counter stores one or more addresses corresponding to one or more pending requests associated with one of the respective buffer memory blocks 310, 312, 314 and 316, in response to a determination that the one of the respective buffer memory blocks 310, 312, 314 and 316 has satisfied a counter threshold. In some implementations, the counter threshold is associated with a maximum value size associated with the reference counters 320, 322, 324 and 326. In some implementations, the counter threshold is associated with a threshold corresponding to a counter overflow of the reference counters 320, 322, 324 and 326. In some implementations, the maximum value size is an unsigned integer. It is to be understood that the overflow counter 330 can be a plurality of over counters, and that the number of overflow counters can vary depending on memory configuration, use case, application, or the like. It is to be further understood that the number of overflow counters can be advantageously fewer than the number of reference counters 320, 322, 324 and 326, but the number of overflow counters is not limited to fewer than the number of reference counters 320, 322, 324 and 326.

In some implementations, the overflow counter 330 stores an indication of a number of requests in addition to a number of requests stored in a reference counter. As one example, a reference counter 320, 322, 324 or 326 can have a 16 bit address space, and an overflow counter 330 can have a 2 bit address space to provide a longer address space for the reference counter 320, 322, 324 or 326 to prevent a buffer overflow. It is advantageous to provide the overflow counter to minimize hardware footprint for a plurality of reference counters where large address spaces are infrequently needed for request management. It is to be understood that the buffer array 300 can include more than one overflow counter, and can include any number of overflow counters. It is to be further understood that the overflow counter can be of bit lengths corresponding to a number of reference counters to store additional addressing bits for a plurality of the buffer memory blocks 310, 312, 314 and 316. As one example, the overflow counter can be of 16 bits, where each 4 bit "nibble" can be associated respectively with a corresponding one of the buffer memory blocks 310, 312, 314 and 316 to provide an additional 4 bits of high-side address bits to each of the buffer memory blocks 310, 312, 314 and 316.

FIGS. 4A-D illustrate an example SRAM buffer array in example first, send, third and fourth states including a first reference counter 410, a second reference counter 420, a third reference counter 430, and a fourth reference counter 440, with respect to a first request count 402, a second request count 404, a third request count 406, and a fourth request count 408. By way of example, the first request count 402 indicates no requests, the second request count 404 indicates one request, the third request count 402 indicates three requests, and the fourth request count 402 indicates four requests.

Figure 4A:
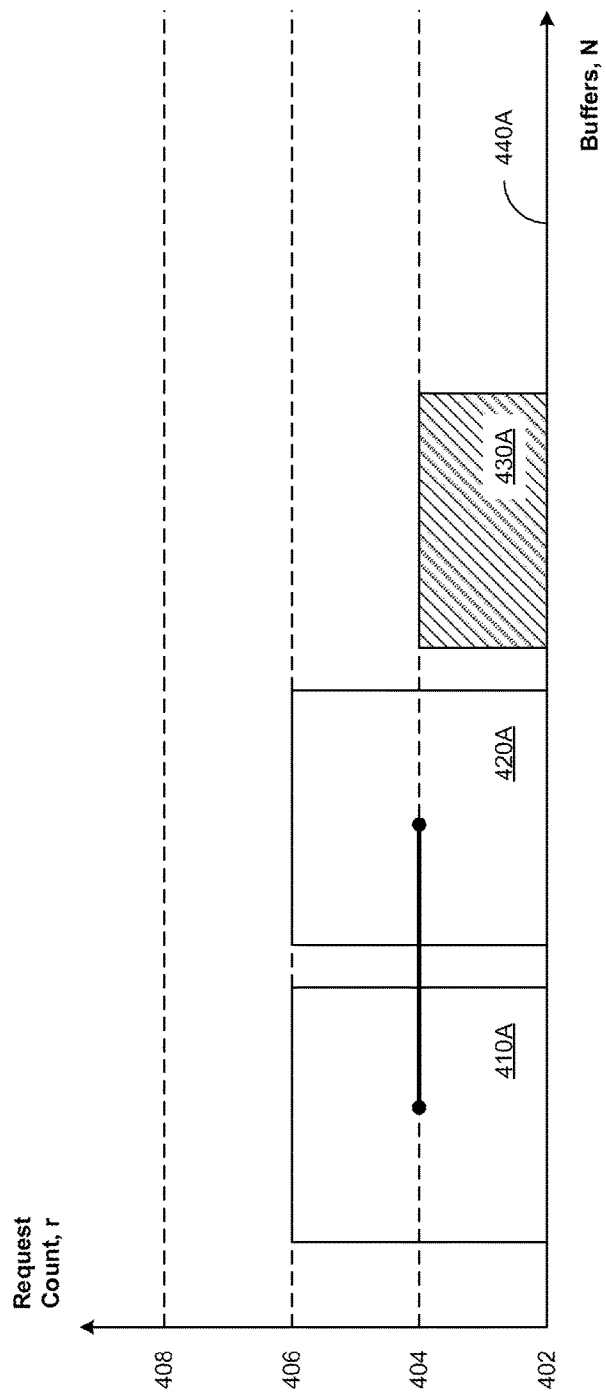
FIG. 4A illustrates an example SRAM buffer array in an example first buffer state, in accordance with present implementations.

FIG. 4A illustrates an example SRAM buffer array in an example first buffer state, in accordance with present implementations. As illustrated by way of example in FIG. 4A, an example buffer array in a first buffer state 400A includes the first reference counter in a first request count state 410A, the second reference counter in a first request count state 420A, the third reference counter in a first request count state 430A, and the fourth reference counter in a first request count state 440A. The first reference counter in the first request count state 410A is associated with the third request count 406, the second reference counter in the first request count state 420A is associated with the third request count 406, the third reference counter in the first request count state 430A is associated with the second request count 404, and the fourth reference counter in a first request count state 440A is associated with the first request count 402. In this example, a buffer memory block associated with the first reference counter in the first state 410A and a buffer memory block associated with the second reference counter in the first state 420A are associated with a linked list of command blocks stored at a buffer memory block for the first reference counter 410 and a buffer memory block for the second reference counter 420. As another example, a buffer memory block associated with the third reference counter in the first state 430A is associated with a command block stored at a buffer memory block for the third reference counter 430.

Figure 4B:
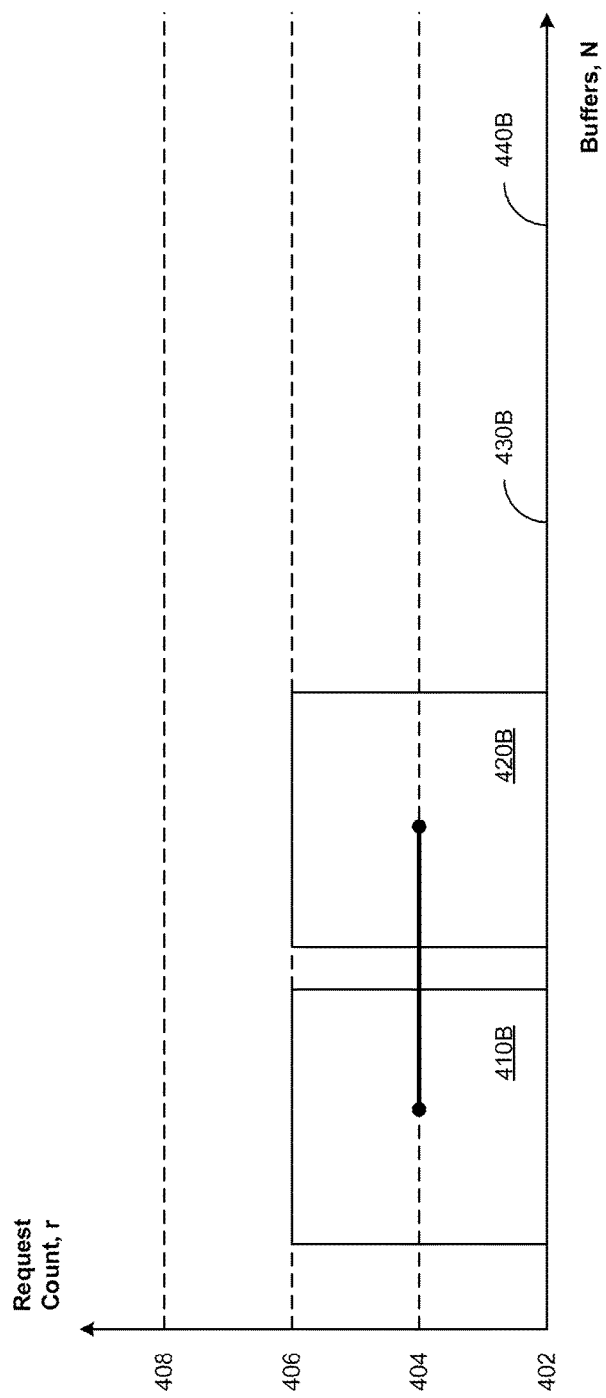
FIG. 4B illustrates an example SRAM buffer array in an example second buffer state further to the example first buffer state of FIG. 4A.

FIG. 4B illustrates an example SRAM buffer array in an example second buffer state further to the example first buffer state of FIG. 4A. As illustrated by way of example in FIG. 4B, an example buffer array in a second buffer state 400B includes the first reference counter in a second request count state 410B, the second reference counter in a second request count state 420B, the third reference counter in a second request count state 430B, and the fourth reference counter in a second request count state 440B. As one example, the example SRAM array enters the example second buffer state 400B from the example first buffer state 400A after a decrement of the third reference counter 430. The first reference counter in the second request count state 410B is associated with the third request count 406, the second reference counter in the second request count state 420B is associated with the third request count 406, the third reference counter in the second request count state 430B is associated with the first request count 402 after a completion of a request associated with the buffer memory block associated with the third reference counter 430, and the fourth reference counter in a second request count state 440B is associated with the first request count 402. It is to be understood that a deallocation of the buffer memory block associated with the third reference counter 430 can be executed before or after the decrementing of the third reference counter 430 to the first request count 402.

Figure 4C:
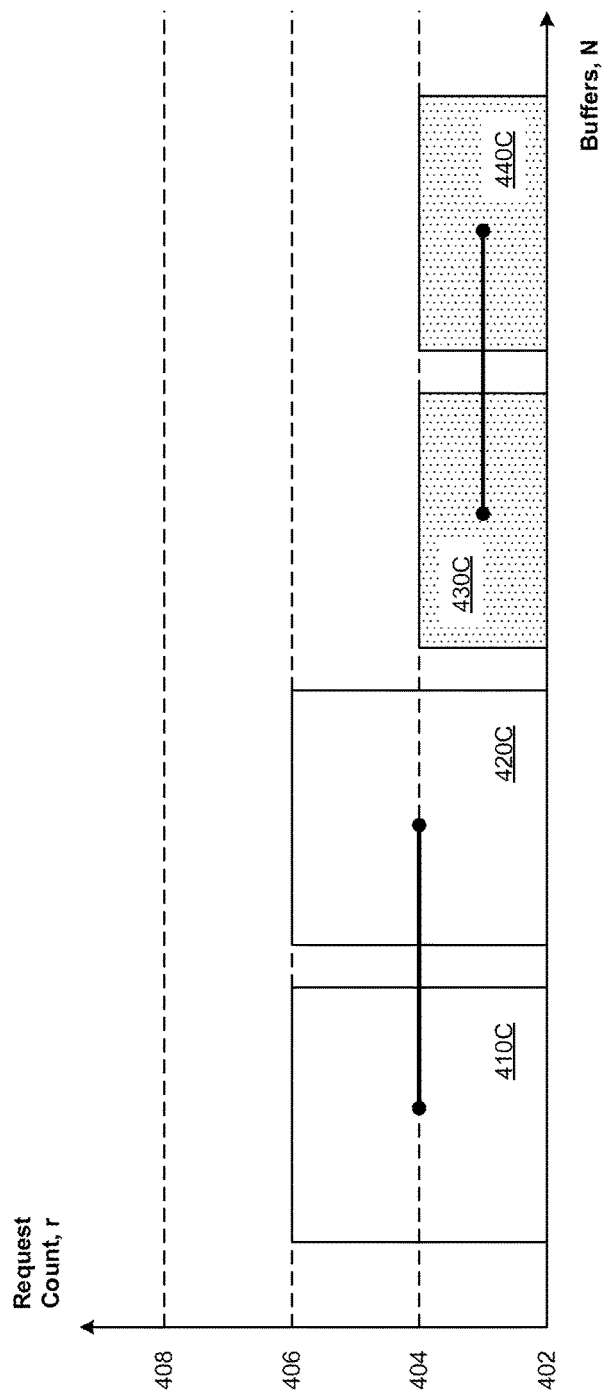
FIG. 4C illustrates an example SRAM buffer array in an example third buffer state further to the example second buffer state of FIG. 4B.

FIG. 4C illustrates an example SRAM buffer array in an example third buffer state further to the example second buffer state of FIG. 4B. As illustrated by way of example in FIG. 4C, an example buffer array in a third buffer state 400C includes the first reference counter in a third request count state 410C, the second reference counter in a third request count state 420C, the third reference counter in a third request count state 430C, and the fourth reference counter in a third request count state 440C. As one example, the example SRAM array enters the example third buffer state 400C from the example second buffer state 400B after an increment of the third reference counter 430 and an increment of the fourth reference counter 440 in response to completion of a request associated with a linked list of command blocks stored at a buffer memory block for the third reference counter 430 and a buffer memory block for the fourth reference counter 440. The first reference counter in the third request count state 410C is associated with the third request count 406, the second reference counter in the third request count state 420C is associated with the third request count 406, the third reference counter in the third request count state 430C is associated with the second request count 404 after addition of a request associated with the buffer memory block associated with the third reference counter 430, and the fourth reference counter in a third request count state 440c is associated with the second request count 404 after addition of a request associated with the buffer memory block associated with the third reference counter 430. It is to be understood that an allocation of the buffer memory block associated with the third reference counter 430 and the fourth reference counter 440 can be executed before or after the incrementing of the third reference counter 430 and the fourth reference counter 440 to the second request count 404.

Figure 4D:
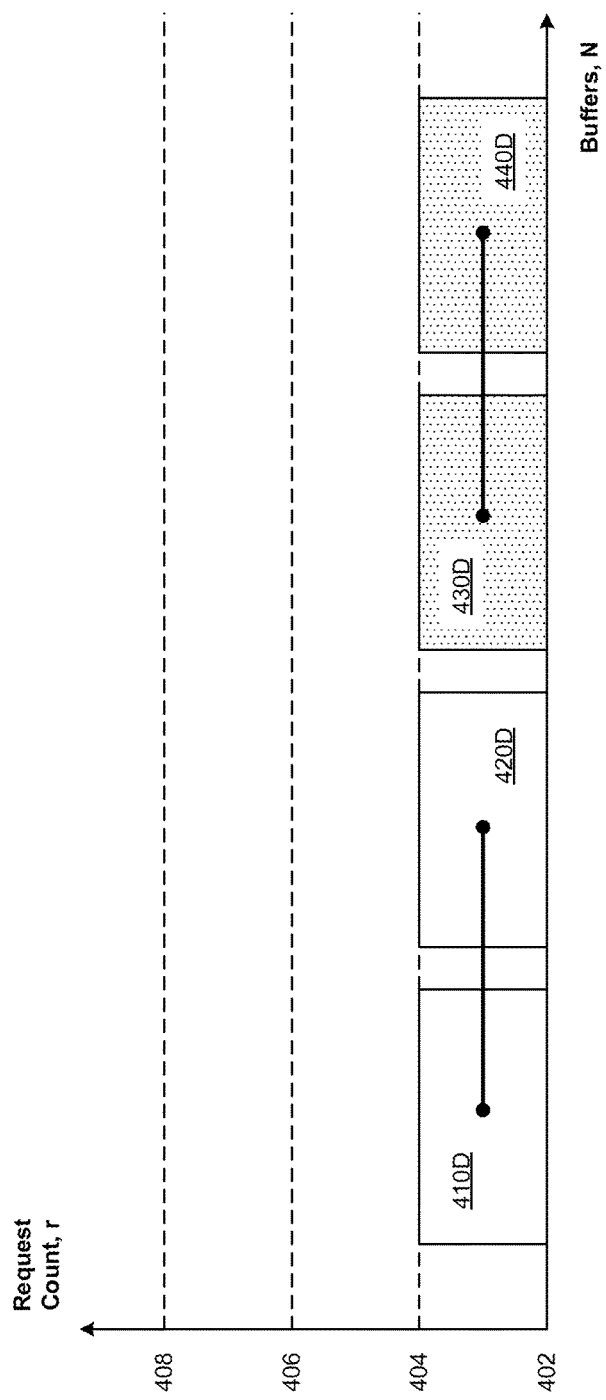
FIG. 4D illustrates an example SRAM buffer array in an example fourth buffer state further to the example third buffer state of FIG. 4C.

FIG. 4D illustrates an example SRAM buffer array in an example fourth buffer state further to the example third buffer state of FIG. 4C. As illustrated by way of example in FIG. 4D, an example buffer array in a fourth buffer state 400D includes the first reference counter in a fourth request count state 410D, the second reference counter in a fourth request count state 420D, the third reference counter in a fourth request count state 430D, and the fourth reference counter in a fourth request count state 440D. As one example, the example SRAM array enters the example fourth buffer state 400D from the example third buffer state 400C after a decrement of the first reference counter 410 and the second reference counter 420 in response to an addition of a request associated with a linked list of command blocks stored at a buffer memory block for the first reference counter 410 and a buffer memory block for the second reference counter 420. The first reference counter in the fourth request count state 410D, the second reference counter in the fourth request count state 420D, the third reference counter in the fourth request count state 430D, and the fourth reference counter in a fourth request count state 440D are associated with the second request count 404 after completion of a request associated with the buffer memory blocks associated with the first and second reference counter 410 and 420.

Figure 5:
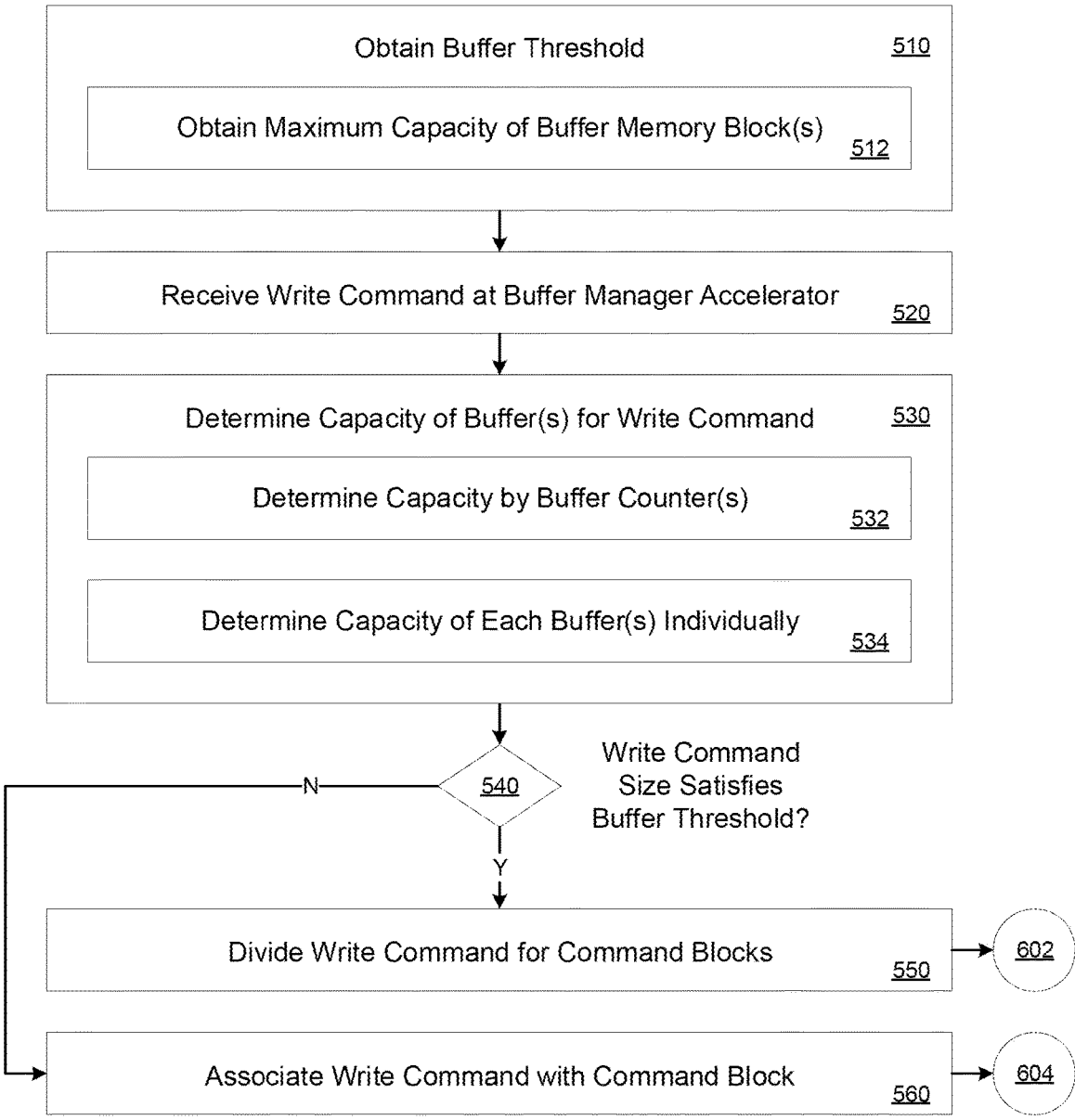
FIG. 5 illustrates an example method of executing a write command to a buffer memory, in accordance with present implementations.

FIG. 5 illustrates an example method of executing a write command to a buffer memory, in accordance with present implementations. In some implementations, at least one of the example system 100 and the example system 200 performs method 500 according to present implementations. In some implementations, the method 500 begins at 510.

At 510, the example system obtains a reference threshold. In some implementations, the reference threshold is a single threshold associated with a plurality of buffer memory blocks each having a corresponding capacity threshold. In some implementations, the reference threshold is a plurality of reference thresholds each associated with a corresponding one or more buffer memory blocks having a corresponding capacity threshold. Thus, it is to be understood that the reference threshold can be or include one or more threshold associated with one or more corresponding buffer memory blocks. In some implementations, 510 includes 512. At 512, the example system obtains a maximum capacity of at least one buffer memory block. As one example, a maximum capacity can be a number of bits. As another example, a maximum capacity can be a maximum size of a command block in bits. The method 500 then continues to 520.

At 520, the example system receives at least one write command at a buffer manager accelerator. In some implementations, the buffer manager accelerator 212 receives the write command from the host 101. It is to be understood that the example system is not limited to a write command, and can receive any command executable on or with respect to an electronic memory device, a memory controller, a memory array, an SRAM array, a NAND array, or the like. The method 500 then continues to 530.

At 530, the example system determines a capacity of at least one buffer for storing the write command. In some implementations, the buffer manager accelerator 212 determines whether the write command can be stored in a single buffer memory block. In some implementations, the buffer manager accelerator 212 determines a particular number of buffer memory blocks required to store the write command. In some implementations, 530 includes at least one of 532 and 534. At 532, the example system determines a capacity of a buffer based at least partially on a reference counter. As one example, the buffer manager accelerator 212 can determine a request capacity of the buffer memory block with respect to at least one of a reference counter associated with the buffer memory block and an overflow counter. At 534, the example system determines a respective capacity for each of a plurality of buffers individually. The method 500 then continues to 540.

At 540, the example system determines whether the write command satisfies the reference threshold. In accordance with a determination that the write command satisfies the reference threshold, the method 500 continues to 550. Alternatively, in accordance with a determination that the write command does not satisfy the reference threshold, the method 500 continues to 560.

At 550, the example system divides the write command for correspondence with a plurality of command blocks. The method 500 then continues to 602.

At 560, the example system associates the write command with a particular command block. As one example, the buffer manager accelerator 212 can associated the write command with one or more command blocks from which the write command can be reconstructed. The method 500 then continues to 604.

Figure 6:
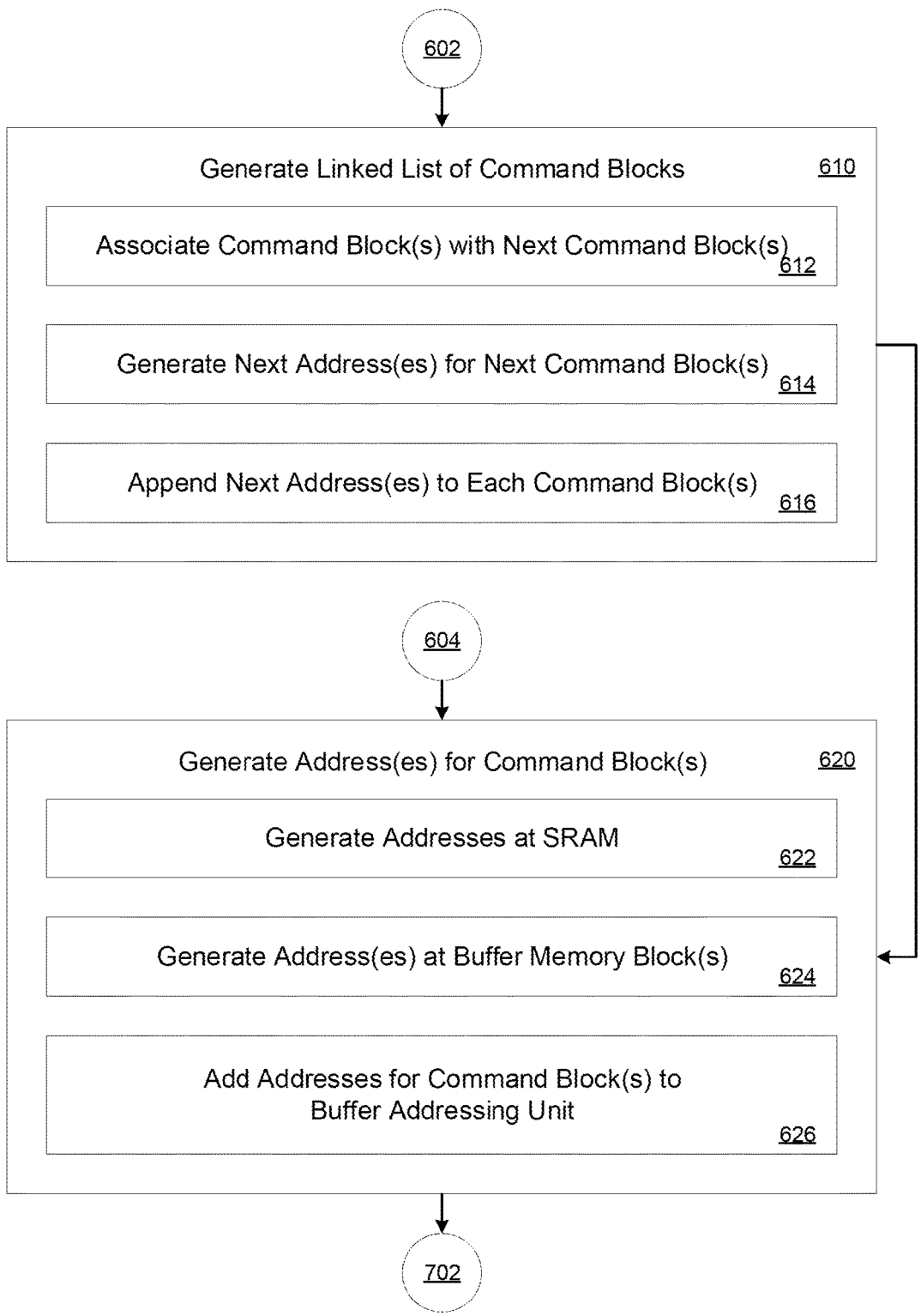
FIG. 6 illustrates an example method of executing a write command to a buffer memory further to the example method of FIG. 5.

FIG. 6 illustrates an example method of executing a write command to a buffer memory further to the example method of FIG. 5. In some implementations, at least one of the example system 100 and the example system 200 performs method 600 according to present implementations. In some implementations, the method 600 begins at 602. The method 600 then continues to 610.

At 610, the example system generates a linked list of command blocks. In some implementations, 610 includes at least one of 612, 614 and 616. At 612, the example system associates at least one command block with at least one next command block. At 614, the example system generates at least one next address associated with at least one next command block. At 616, the example system appends at least one next address to at least one command block associated with a next command block corresponding to the next address. The method 600 then continues to 620.

At 620, the example system generates one or more addresses associated with one or more corresponding command blocks. In some implementations, 620 includes at least one of 622, 624 and 626. At 622, the example system generates one or more addresses at an SRAM array. At 624, the example system generates one or more addresses at one or more corresponding buffer memory blocks. At 626, the example system adds one or more addresses associated with one or more corresponding commands blocks to a buffer addressing unit. In some implementations, the buffer manager accelerator 212 instructs the buffer addressing unit to store one or more physical addresses associated with corresponding command blocks. In some implementations, the address include a block identifier indicating a particular buffer memory block of the SRAM array. It is to be understood that the buffer manager accelerator 212 can directly address a particular buffer memory block within a buffer array of an SRAM array by the addresses associated with the command blocks at the buffer addressing unit. The method 600 then continues to 702.

Figure 7:
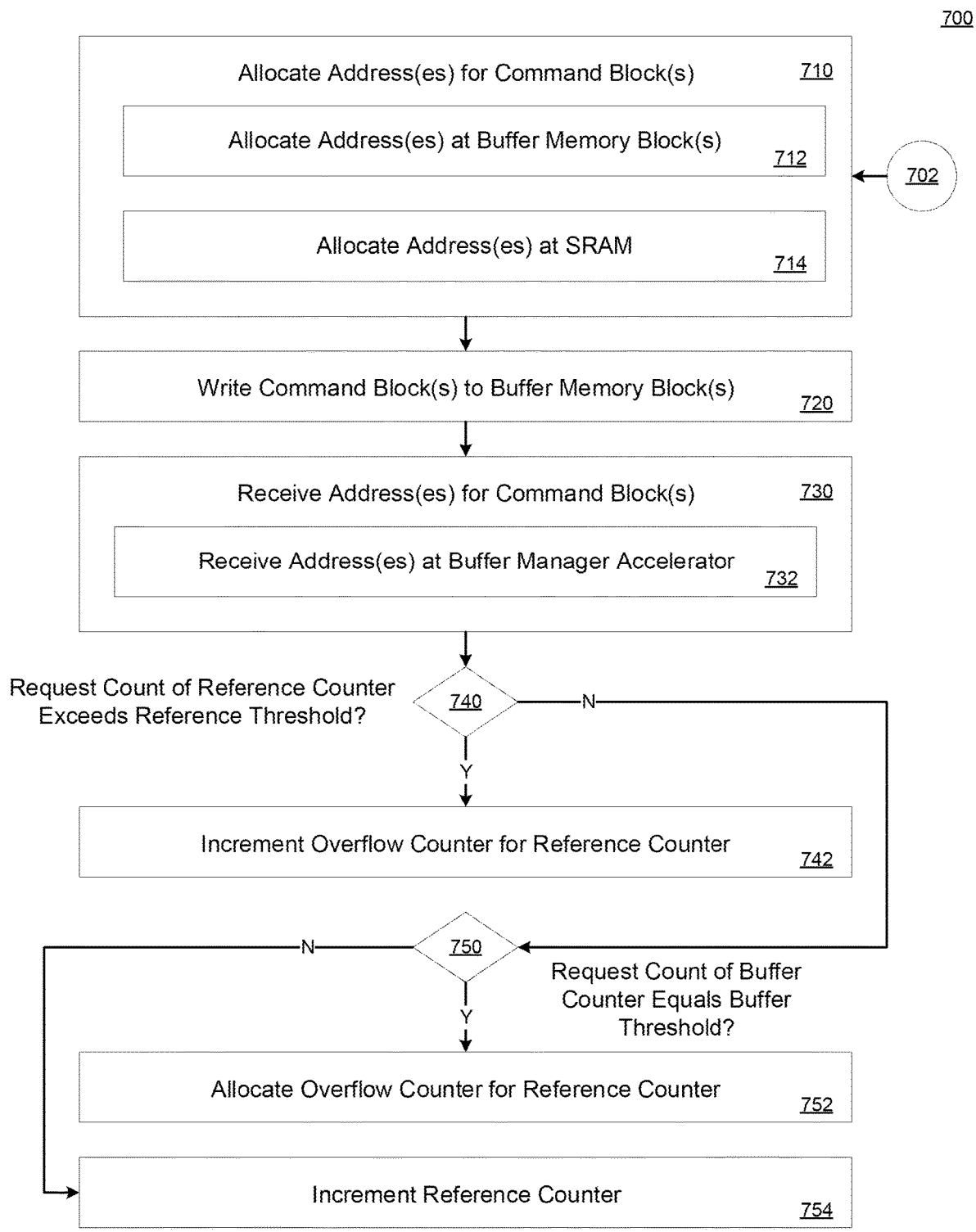
FIG. 7 illustrates an example method of executing a write command to a buffer memory further to the example method of FIG. 6.

FIG. 7 illustrates an example method of executing a write command to a buffer memory further to the example method of FIG. 6. In some implementations, at least one of the example system 100 and the example system 200 performs method 700 according to present implementations. In some implementations, the method 700 begins at 702. The method 700 then continues to 710.

At 710, the example system allocates one or more addresses associated with one or more corresponding command blocks. In some implementations, 710 includes at least one of 712 and 714. At 712, the example system allocates one or more address at one or more buffer memory blocks. At 714, the example system allocates one or more addresses at an SRAM array. The method 700 then continues to 720.

At 720, the example system writes one or more command blocks to one or more buffer memory blocks. The method 700 then continues to 730.

At 730, the example system receives one or more addresses for one or more corresponding command blocks. In some implementations, 730 includes 732. At 732, the example system receives one or more addresses at a buffer manager accelerator. The method 700 then continues to 740.

At 740, the example system determines whether a request count for a reference counter exceeds a reference threshold. Where the reference counter exceeds the reference threshold, the reference counter can be in an overflow state in which further incrementing of the reference counter is transferred to incrementing of an overflow counter allocated to the reference counter. Thus, a total count of the number of requests associated with the reference counter can correspond to a sum of a reference count indicated by a reference counter and an overflow count indicated by an overflow counter allocated to the reference counter. In accordance with a determination that a request count for a reference counter exceeds a reference threshold, the method 700 continues to 742. Alternatively, in accordance with a determination that a request count for a reference counter does not exceed a reference threshold, the method 700 continues to 750.

At 742, the example system increments an overflow counter associated with, allocated to, or the like, the reference counter. As one example, the reference counter can have a binary 8-bit length, with a maximum decimal address of 255. An overflow counter can be incremented to indicate additional buffer counts for the reference counter beyond its maximum address. As another example, the overflow count can be represented as a coordinate including the reference count and the overflow count. As one example, a coordinate can be (255, 1), where an overflow counter is allocated and has been incremented to reflect a total request count of 256. In some implementations, the method 700 ends at 742.

At 750, the example system determines whether a request count for a reference counter equals a reference threshold. Where the reference counter equals the reference threshold, the reference counter can be considered to enter an overflow state in which further incrementing of the reference counter is ceased. An overflow counter can be allocated to the reference counter when the reference counter reaches its maximum count. A subsequent request count increment can then be executed on the allocated overflow counter, at 740 and 742. In accordance with a determination that a request count for a reference counter equals a reference threshold, the method 700 continues to 752. Alternatively, in accordance with a determination that a request count for a reference counter does not equal a reference threshold, the method 700 continues to 754.

At 752, the example system allocates an overflow counter corresponding to a reference counter. As one example, the reference counter can have a binary 8-bit length, with a maximum decimal address of 255. An overflow counter can be allocated to allow indication of additional reference counts for the reference counter beyond its maximum address. Where the overflow count can be represented as a coordinate including the reference count and the overflow count, a coordinate can be (255, 0). As one example, an overflow counter can be allocated at a value of zero to reflect a total request count of 255. In some implementations, the method 700 ends at 752.

At 754, the example system increments a reference counter. As one example, the reference counter can have a binary 8-bit length, with a maximum decimal address of 255. As another example, the reference counter can have any buffer count between 0 and 255 without allocation of an overflow counter. Where the overflow count can be represented as a coordinate including the reference count and the overflow count, a coordinate can be (100, ∅), where the reference count is below 255 and the overflow count has a null value, because no overflow counter is allocated to the reference counter. In some implementations, the method 700 ends at 754.

Figure 8:
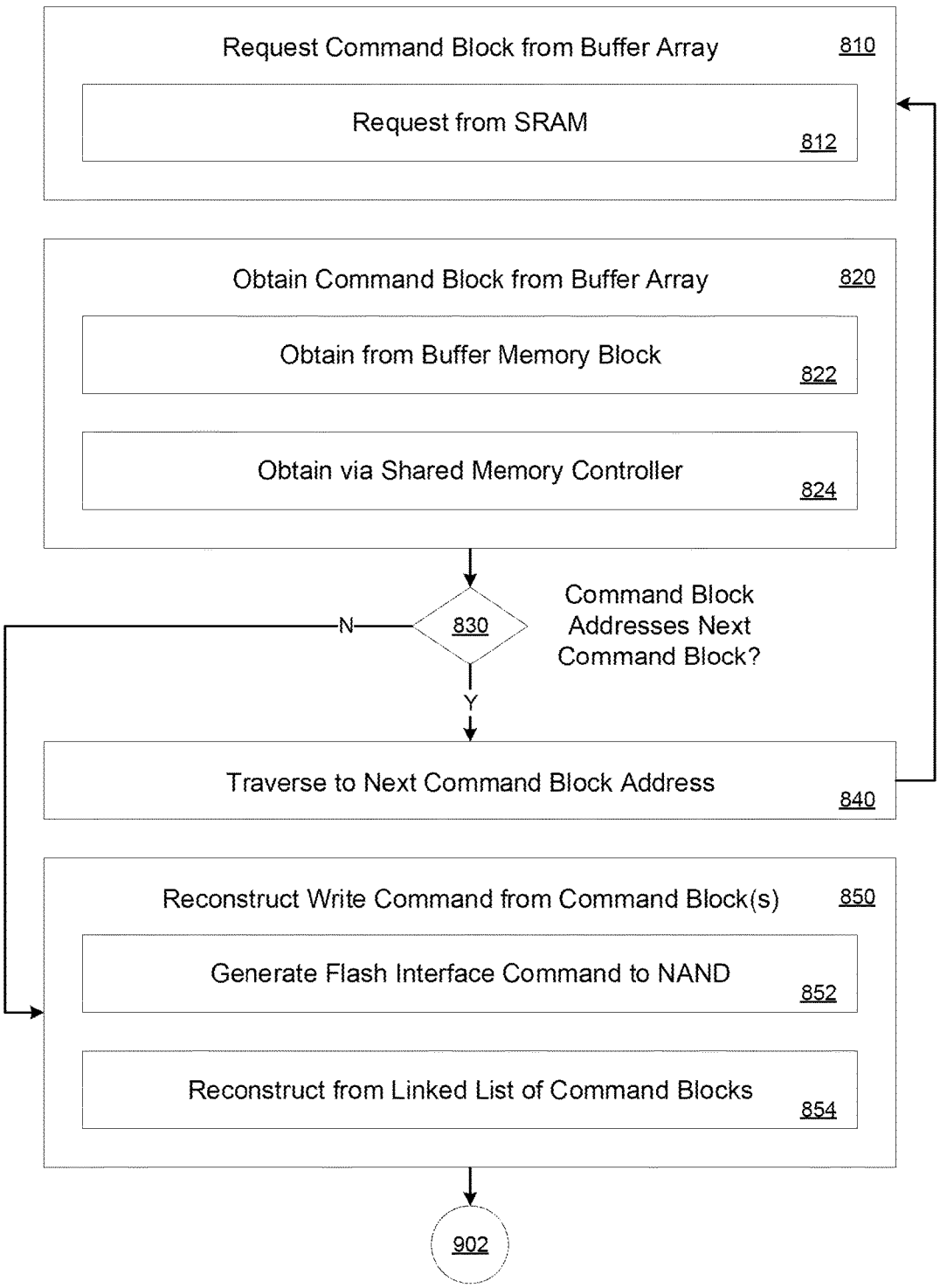
FIG. 8 illustrates an example method of executing a write command from a buffer memory, in accordance with present implementations.

FIG. 8 illustrates an example method of executing a write command from a buffer memory, in accordance with present implementations. In some implementations, at least one of the example system 100 and the example system 200 performs method 800 according to present implementations. In some implementations, the method 800 begins at 810.

At 810, the example system requests a command block from a buffer array. In some implementations, 810 includes 812. At 812, the example system requests a command block from an SRAM array. The method 800 then continues to 820.

At 820, the example system obtains at least one command block from the buffer array. In some implementations, 820 includes at least one of 822 and 824. At 822, the example system obtains the command block from a buffer memory block. At 824, the example system obtains the command block from a shared memory controller. The method 800 then continues to 830.

At 830, the example system determines whether a command block addresses a next command block. In some implementations, the shared memory controller 222 attempts to read a next address at a predetermined logical location within a command block associated with a next command block. As one example, the predetermined logical location can include an address to a buffer memory block. In accordance with a determination that a command block addresses a next command block, the method 800 continues to 840. Alternatively, in accordance with a determination that the command block does not address a next command block, the method 800 continues to 850.

At 840, the example system traverses to the next command block address. In some implementations, the shared memory controller 222 traverse to the next command block address at the corresponding buffer memory block of the buffer array 300. The method 800 then continues to 810.

At 850, the example system reconstructs a write command from one or more command blocks. In some implementations, the flash interface 110 receives a plurality of command blocks from the shared memory controller 222 and reconstructs a write command from the plurality of command blocks. Alternatively, in some implementations, the shared memory controller 222 obtains the plurality of command blocks from the buffer array and reconstructs the write command for the flash interface 110 before transmitted the reconstructed write command to the flash interface 110. In some implementations, at least one of the flash interface 110 and the shared memory controller 222 selectably controls whether the reconstruction occurs at the flash interface 100 or the shared memory controller 222. It is to be understood that the reconstructing is not limited to a write command, as discussed above. In some implementations, 850 includes at least one of 852 and 854. At 852, the example system generates a flash interface command executable to NAND. At 854, the example system reconstructs a write command from a linked list including a plurality of command blocks. The method 800 then continues to 902.

Figure 9:
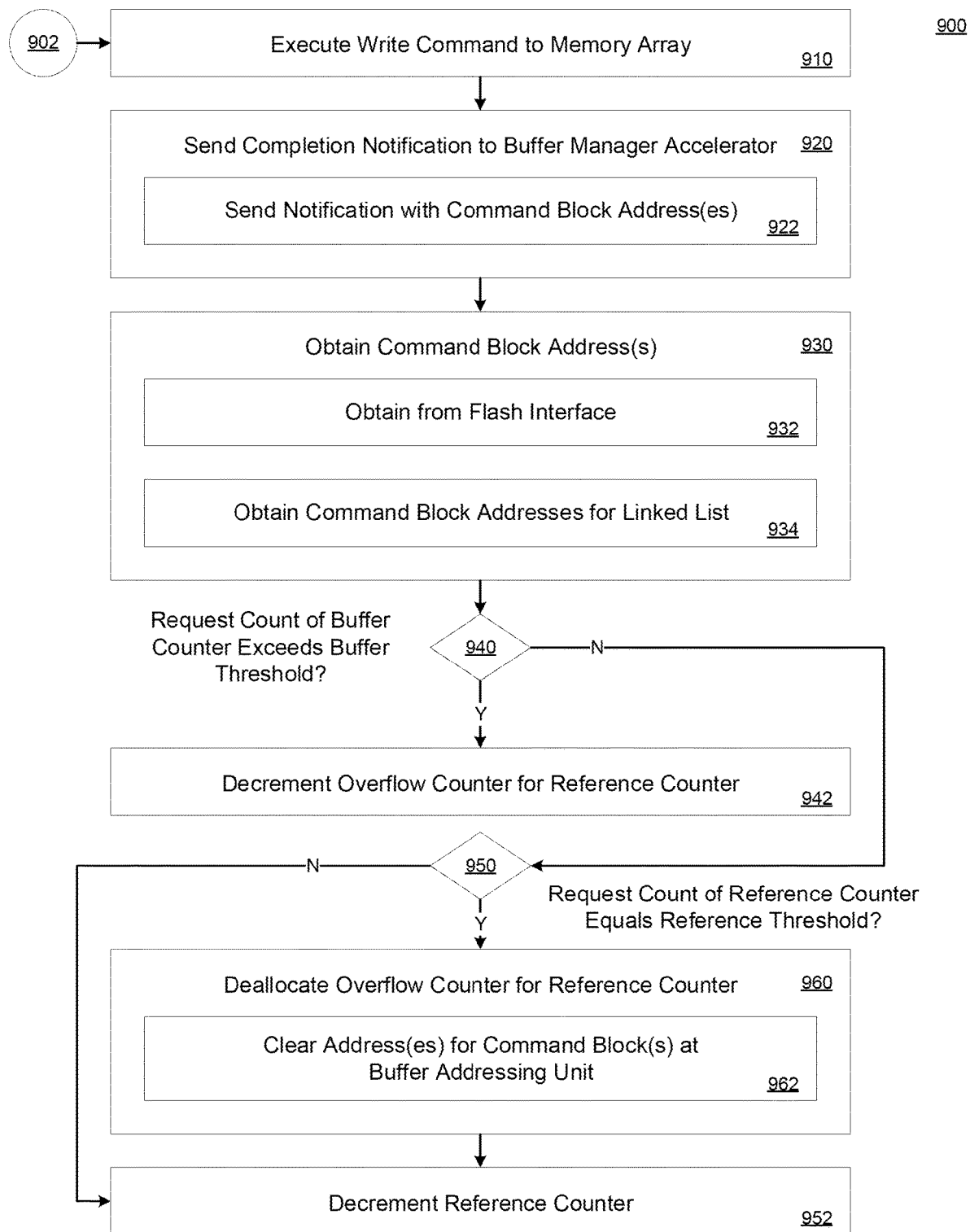
FIG. 9 illustrates an example method of executing a write command from a buffer memory further to the example method of FIG. 8.

FIG. 9 illustrates an example method of executing a write command from a buffer memory further to the example method of FIG. 8. In some implementations, at least one of the example system 100 and the example system 200 performs method 900 according to present implementations. In some implementations, the method 900 begins at 902. At 902, the method 900 then continues to 910.

At 910, the example system executes a write command to a memory array. It is to be understood that the execution is not limited to a write command, as discussed above. The method 900 then continues to 920.

At 920, the example system sends a completion notification to a buffer manager accelerator. In some implementations, a completion notification corresponds to an indication identifying one or more of an address, a command block, a buffer memory block, a reference counter, and an overflow counter. In some implementations, 920 includes 922. At 922, the example system sends a notification including at least one command block address. The method 900 then continues to 930.

At 930, the example system obtains at least one command block address. In some implementations, 930 includes at least one of 932 and 934. At 932, the example system obtains a command block address from a flash interface. At 934, the example system obtains one or more command blocks associated with addresses corresponding to addresses associated with a linked list of one or more command blocks. The method 900 then continues to 940.

At 940, the example system determines whether a request count for a reference counter exceeds a reference threshold. Where the reference counter exceeds the reference threshold, a total count of the number of requests associated with the reference counter can correspond to a sum of a static reference count indicated by a reference counter and a changing overflow count indicated by an overflow counter allocated to the reference counter. In accordance with a determination that a request count for a reference counter exceeds a reference threshold, the method 900 continues to 942. Alternatively, in accordance with a determination that a request count for a reference counter does not exceed a reference threshold, the method 900 continues to 950.

At 942, the example system decrements an overflow counter associated with, allocated to, or the like, the reference counter. As one example, the reference counter can have a binary 8-bit length, with a maximum decimal address of 255. An overflow counter can be decremented to indicate accurate reference counts for the reference counter beyond its maximum address. As one example, a coordinate can be (255, 1), where an overflow counter is allocated and has been decremented from (255, 2) to reflect a total request count of 256. In some implementations, the method 900 ends at 942.

At 950, the example system determines whether a request count for a reference counter equals a reference threshold. Where the reference counter equals the reference threshold, the reference counter can be considered to exit an overflow state in which further decrementing of the overflow counter is ceased and decrementing of the reference counter is started or restarted. An overflow counter can be deallocated to the reference counter when the overflow counter reaches its minimum count. A subsequent request count decrement can then be executed on the reference counter associated with the overflow counter, at 954. In accordance with a determination that a request count for a reference counter equals a reference threshold, the method 900 continues to 960. Alternatively, in accordance with a determination that a request count for a reference counter does not equal a reference threshold, the method 900 continues to 952.

At 960, the example system deallocates an overflow counter corresponding to a reference counter. As one example, the reference counter can have a binary 8-bit length, with a maximum decimal address of 255. An overflow counter can be deallocated to free the overflow counter for use with another reference counter that may be associated with a number of requests beyond its maximum address. Where the overflow count can be represented as a coordinate including the reference counter and the overflow count, a coordinate can be (255, 0). As one example, an overflow counter can be deallocated to (255, Ø), to reflect a total request count of 255 and that no overflow counter is allocated to the reference counter. In some implementations, 960 includes 962. At 962, the example system clears at least one address associated with at least one corresponding command block at a buffer addressing unit. As one example, the buffer manager accelerator 212 can allocate command blocks to any buffer memory block not associated with an address at the buffer addressing unit 216. In some implementations, the method 900 ends at 960.

At 952, the example system decrements a reference counter. As one example, the reference counter can have a binary 8-bit length, with a maximum decimal address of 255. As another example, the reference counter can have any reference count between 0 and 255 without allocation of an overflow counter. Where the overflow count can be represented as a coordinate including the reference count and the overflow count, a coordinate can be decremented to (100, Ø) from (101, Ø), where the reference count is below 255 and the overflow count has a null value, because no overflow counter is allocated to the reference counter. In some implementations, the method 900 ends at 952.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A non-transitory processor-readable media comprising processor-readable instructions, such that, when executed by a processor, causes the processor to:
   identify a request to access a memory device, the memory device having an associated buffer memory;
   in response to the request, determine whether a request count associated with a buffer memory block in the buffer memory satisfies a reference threshold, wherein the reference threshold corresponds to a maximum storage size of the buffer memory block;
   update, in accordance with a determination that the request count does not satisfy the reference threshold, the request count by incrementing a reference counter associated with the buffer memory block;
   allocate an overflow counter to the reference counter, in response to a determination that the request count satisfies the reference threshold;
   increment, in response to a determination that the overflow counter is allocated to the reference counter, an overflow count associated with the overflow counter.

2. The non-transitory processor-readable media of claim 1, wherein the processor is further caused to:
   generate at least one memory address corresponding respectively to at least one command block, the at least one command block being associated with a command to the memory device from which the request to access the memory device is identified; and
   allocate the at least one memory address to a buffer addressing unit associated with a host interface, the at least one memory address including a buffer memory identifier associated with the buffer memory block and a buffer memory address associated with the buffer memory block.

3. The non-transitory processor-readable media of claim 2, wherein the processor is further caused to:
   divide the command into a plurality of the at least one command blocks, in response to a determination that the command exceeds a reference threshold associated with the buffer memory block; and
   generate a linked list comprising the plurality of command blocks, in response to the determination that the command exceeds a buffer threshold.

4. The non-transitory processor-readable media of claim 3, wherein the processor is further caused to:
   associate at least a first command block of the plurality of command blocks with a second command block of the plurality of command blocks, and append a next memory address associated with the second command block to the first command block, to generate the linked list comprising the plurality of command blocks.

5. The non-transitory processor-readable media of claim 3, wherein the processor is further caused to:
   associate at least a first command block of the plurality of command blocks with a second command block of the plurality of command blocks, to generate the linked list comprising the plurality of command blocks.

6. The non-transitory processor-readable media of claim 2, wherein the processor is further caused to:
   write the at least one command block to the buffer memory address of the buffer memory block.

7. The non-transitory processor-readable media of claim 6, wherein the processor is further caused to:
   determine whether the command exceeds the buffer threshold.

8. The non-transitory processor-readable media of claim 6, wherein the host interface includes the buffer addressing unit.

9. The non-transitory processor-readable media of claim 6, wherein the buffer memory block comprises SRAM.

10. A non-transitory processor-readable media comprising processor-readable instructions, such that, when executed by a processor, causes the processor to:
 identify a request to access a memory device, the memory array having an associated buffer memory;
 in response to the request, send a completion notification to a buffer manager accelerator, the completion notification indicating at least one command block address corresponding to at least one command block at a buffer memory block in the buffer memory, wherein a reference counter is associated with the buffer memory block;
 decrement, in response to a determination that an overflow counter is allocated to the reference counter, the overflow counter;
 determine whether a request count satisfies a reference threshold associated with the reference counter, wherein the reference threshold corresponds to a maximum storage size of the buffer memory block; and
 deallocate the overflow counter from the reference counter, in response to a determination that the request count satisfies the reference threshold.

11. The non-transitory processor-readable media of claim 10, wherein the processor is further caused to:
 determine whether the request count indicates that at least one request is associated with the at least one command block;
 deallocate the at least one command block address corresponding to the at least one command block, in response to a determination that the request count indicates that no request is associated with the at least one command block; and
 send the completion notification to the buffer manager accelerator in response to the processor being caused to execute a command to the memory array from which the request to access the memory array is identified.

12. The non-transitory processor-readable media of claim 11, wherein the command is associated with the at least one command block.

13. The non-transitory processor-readable media of claim 11, wherein the processor is further caused to:
 reconstruct the command from the at least one command block.

14. The non-transitory processor-readable media of claim 10, wherein the processor is further caused to:
 reconstruct the command from a plurality of the at least one command blocks.

15. The non-transitory processor-readable media of claim 14, wherein the processor is further caused to:
 determine whether the at least one command block indicates a next command block address associated with a next command block; and
 obtain the next command block from a next buffer memory block.

16. The non-transitory processor-readable media of claim 14, wherein the at least one command block and the next command block comprise a linked list.

17. The non-transitory processor-readable media of claim 10, wherein the processor is further caused to:
 obtain the at least one command block from the buffer memory block.

18. A storage device, comprising:
 a non-volatile memory;
 a host interface configured to:
  generate at least one memory address corresponding respectively to at least one command block, the command block being associated with a command to a memory device;
  allocate the at least one memory address to a buffer addressing unit associated with a host interface, the at least one memory address including a buffer memory identifier associated with a buffer memory block and a buffer memory address associated with the buffer memory block;
  determine whether a request count associated with the buffer memory block satisfies a reference threshold;
  update, in accordance with a determination that the request count does not satisfy the reference threshold, the request count by incrementing a reference counter associated with the buffer memory block;
  allocate an overflow counter to the reference counter, in response to a determination that the request count satisfies the reference threshold;
  increment, in response to a determination that the overflow counter is allocated to the reference counter, an overflow count associated with the overflow counter; and
  decrement, in response to a determination that the overflow counter is allocated to the reference counter, the overflow count associated with the overflow counter;
 a flash interface configured to:
  reconstruct the command from the command block; and
  send the completion notification to the host interface, the completion notification indicating the command block address corresponding to the command block at the buffer memory block.

19. The storage device of claim 18, wherein the processor is further caused to:
 reconstruct the command from a plurality of command blocks,
 wherein the at least one command block comprises the plurality of command blocks.

20. The storage device of claim 19, wherein the processor is further caused to:
 determine whether the command block indicates a next command block address associated with a next command block; and
 obtain the next command block from a next buffer memory block,
 wherein the command block and the next command block comprise a linked list.

* * * * *